US006755907B1

(12) United States Patent
Westerman et al.

(10) Patent No.: US 6,755,907 B1
(45) Date of Patent: Jun. 29, 2004

(54) GYPSUM COMPOSITION WITH STYRENE BUTADIENE LATEX ADDITIVE

(75) Inventors: John I. Westerman, Wadsworth, OH (US); Paul A. Hardy, Wadsworth, OH (US); Roman Zorska, University Heights, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/464,174

(22) Filed: Dec. 16, 1999

Related U.S. Application Data

(63) Continuation-in-part of application No. 09/237,512, filed on Jan. 26, 1999, now Pat. No. 6,184,287.

(51) Int. Cl.$^7$ .......................... C04B 11/00; C04B 16/04; C04B 24/26; C04B 26/24; C08F 236/10
(52) U.S. Cl. ........................ 106/778; 106/461; 106/780; 523/201; 524/8; 524/423; 524/458; 524/567; 524/555; 524/575; 524/609
(58) Field of Search ........................... 524/8, 423, 458, 524/547, 555, 575, 609; 523/201; 106/461, 778, 780

(56) References Cited

U.S. PATENT DOCUMENTS

| | | |
|---|---|---|
| 3,043,790 A | 7/1962 | Sanders |
| 3,852,083 A | 12/1974 | Yang |
| 3,869,415 A | 3/1975 | Williams |
| 3,895,018 A | 7/1975 | Adolf |
| 3,895,953 A | 7/1975 | Mehta |
| 3,936,408 A | 2/1976 | Adams et al. |
| 3,943,996 A | 3/1976 | Guilbault et al. |
| 4,002,713 A | 1/1977 | Duncan et al. |
| 4,015,991 A | 4/1977 | Persinski et al. |
| 4,042,409 A | 8/1977 | Terada et al. |
| 4,051,291 A | 9/1977 | Long |
| 4,057,662 A | 11/1977 | Johnson et al. |
| RE29,595 E | 3/1978 | Adams et al. |
| 4,086,201 A | 4/1978 | Peters et al. |
| 4,151,150 A | 4/1979 | Peters et al. |
| 4,202,809 A | 5/1980 | Eash |
| 4,265,964 A | 5/1981 | Burkhart |
| 4,272,426 A | 6/1981 | Feast |
| 4,448,923 A | 5/1984 | Reeb et al. |
| 4,478,974 A | 10/1984 | Lee et al. |
| 4,480,078 A | 10/1984 | Gujarathi |
| 4,537,918 A | 8/1985 | Parcevaux et al. |
| 4,542,185 A | 9/1985 | Meunier |
| 4,613,633 A | 9/1986 | Sekiya et al. |
| 4,657,966 A | 4/1987 | Mallya |
| 4,659,773 A | 4/1987 | Itoh et al. |
| 4,700,780 A | 10/1987 | Brothers |
| 4,721,160 A | 1/1988 | Parcevaux et al. |
| 4,735,907 A | 4/1988 | Schaeffer et al. |
| 4,752,538 A | 6/1988 | Bounini |
| 4,767,460 A | 8/1988 | Parcevaux et al. |
| 4,780,503 A | 10/1988 | Mallya |
| 4,791,161 A | 12/1988 | Leising |
| 4,791,162 A | 12/1988 | Vanderhoff et al. |
| 4,806,164 A | 2/1989 | Brothers |
| 4,894,397 A | 1/1990 | Morgan et al. |
| 4,972,032 A | 11/1990 | Henton et al. |
| 4,988,390 A | 1/1991 | Kambayashi et al. |
| 5,026,576 A | 6/1991 | Benvenuto et al. |
| 5,039,764 A | 8/1991 | Steinwand |
| 5,075,358 A | 12/1991 | Riley et al. |
| 5,081,166 A | 1/1992 | Kiehtbauch et al. |
| 5,099,922 A | 3/1992 | Ganguli |
| 5,155,315 A | 10/1992 | Malkin et al. |
| 5,171,768 A | 12/1992 | Prentice |
| 5,177,153 A | 1/1993 | Libermann et al. |
| 5,191,008 A | 3/1993 | Frost et al. |
| 5,191,009 A | 3/1993 | Chen et al. |
| 5,198,492 A | 3/1993 | Stack |
| 5,216,065 A | 6/1993 | Colyer et al. |
| 5,225,474 A | 7/1993 | Jon et al. |

(List continued on next page.)

FOREIGN PATENT DOCUMENTS

| | | |
|---|---|---|
| DE | 196 20 387 A1 | 12/1996 |
| EP | 0391675 | 10/1990 |
| EP | 792891 | 9/1997 |
| EP | 814103 | 12/1997 |
| GB | 1111711 | 5/1968 |
| GB | 1592796 | 7/1991 |
| WO | WO 92/17417 | 10/1992 |

OTHER PUBLICATIONS

Kirk–Othmer, *Encyclopedia of Chemical Technology*, 2$^{nd}$ Edition, 1970, pp. 621–624, vol. 21, John Wiley & Sons, Inc.

DE Patent 2 927 785, Abstract and English translation of cover page. 2/81.

JP 0127 256 A, Abstract and English translation from *Patent Bureau of Japan, Official Gazette for Unexamined Patents*, publ. Jul. 6, 1985.

SU Patent No. 577 186, Abstract and English translation from *Union of Socialist Soviet Republics, Invention Specification Pertaining to a Certificate of Authenticity*, publ. Nov. 18, 1977.

*Chemical Abstracts*, vol. 114, No. 8, Abstract XP000192701, Columbus, OH U.S.A., Feb. 25, 1991 JP02137781 5/90.

(List continued on next page.)

*Primary Examiner*—Kelechi C. Egwim
(74) *Attorney, Agent, or Firm*—Hudak, Shunk & Farine; David G. Burleson

(57) ABSTRACT

Gypsum wallboard made lighter and less dense, without sacrificing strength, by adding to the gypsum slurry used in making the board a styrene butadiene polymer latex substantially stable against divalent ions in which the styrene butadiene polymer latex substantially stable against divalent ions in which the styrene butadiene polymer includes at least 0.25 wt. % of an ionic monomer.

31 Claims, No Drawings

U.S. PATENT DOCUMENTS

| | | | |
|---|---|---|---|
| 5,250,153 A | | 10/1993 | Izard et al. |
| 5,258,428 A | | 11/1993 | Gopalkrishnan |
| 5,274,027 A | * | 12/1993 | Guillaume et al. ......... 524/814 |
| 5,286,779 A | | 2/1994 | Chuang et al. |
| 5,294,659 A | | 3/1994 | Kidder |
| 5,302,655 A | | 4/1994 | Guillaume et al. |
| 5,331,035 A | | 7/1994 | Hall |
| 5,340,392 A | | 8/1994 | Westbrook et al. |
| 5,342,875 A | | 8/1994 | Noda |
| 5,354,800 A | | 10/1994 | Suzuki et al. |
| 5,514,758 A | | 5/1996 | Muller et al. |
| 5,569,324 A | | 10/1996 | Totten et al. |
| 5,583,173 A | | 12/1996 | Gujaratbi et al. |
| 5,588,488 A | | 12/1996 | Vijn et al. |
| 5,631,312 A | | 5/1997 | Takada et al. |
| 5,663,231 A | | 9/1997 | Muller et al. |
| 5,725,656 A | | 3/1998 | Shimanovich et al. |
| 5,726,259 A | | 3/1998 | Hayes et al. |
| 5,741,539 A | | 4/1998 | Knipper et al. |
| 5,750,618 A | | 5/1998 | Vogt et al. |
| 5,756,573 A | | 5/1998 | Trumbo et al. |
| 5,770,303 A | | 6/1998 | Weinert et al. |
| 5,837,762 A | | 11/1998 | Stollmaier et al. |
| 5,872,200 A | | 2/1999 | Sharma et al. |
| 5,879,825 A | | 3/1999 | Burke et al. |
| 5,891,947 A | | 4/1999 | Hall et al. |
| 5,962,178 A | | 10/1999 | Cheng |
| 5,969,032 A | | 10/1999 | Phan et al. |
| 6,001,922 A | | 12/1999 | Clark et al. |
| 6,028,135 A | * | 2/2000 | Keller et al. ................ 524/458 |
| 6,103,802 A | | 8/2000 | Zhang et al. |
| 6,171,388 B1 | | 1/2001 | Jobbins |
| 6,184,287 B1 | | 2/2001 | Westerman |
| 6,291,573 B1 | * | 9/2001 | Pakusch et al. ............. 524/503 |

OTHER PUBLICATIONS

*Database WPI*, Section Ch, Wk. 9317, Derwent Publications Ltd., Abstract XP002062259, London, GB. JP05078154 3/93.

Jobbins, Richard M., Int'l. Patent Appln. No. WO 99/47470, *Lightweight Gypsum Composition*, publ. Sep. 23, 1999.

Kirk–Othmer, *Encyclopedia of Chemical Technology*, $4^{th}$ Edition, 1991, pp. 812–826, vol. 4, John Wiley & Sons, Inc.

N. Irving Sax et al., *Hawley's Condensed Chemical Dictionary*, $11^{th}$ Edition, 1987, p. 564, Van Nostrand Reinhold Co., New York.

FR Patent No. 2 125 733, Sep. 29, 1972, English translation of published application.

DE Patent No. 2 404 952, Aug. 8, 1974, English translation of published application.

DE Patent 2 649 300, May 3, 1978, English translation of published application.

GB 1390360, Apr. 9, 1975, Document Description printed from esp@cenet.

Correspondence to Anthony Nimmo of Howrey, Simonm, Arnold & White, LLP dated Oct. 5, 2001 from John E. Miller of Calfee, Halter & Griswold LLP regarding inventorship of application, including related attachments.

Correspondence to John E. Miller of Calfee, Halter & Griswold LLP dated Oct. 23, 2001 from John Westerman of Omnova Solutions Inc. regarding history of invention, including related attachments.

Correspondence to John E. Miller of Calfee, Halter & Griswold LLP dated Nov. 19, 2001 from Anthony Nimmo of Howrey, Simon, Arnold & White, LLP regarding review of documents and assessment, including related attachments.

Communication from European Patent Office dated Sep. 13, 2001 transmitting European Search Report in corresponding European patent application, including cited references.

* cited by examiner

GYPSUM COMPOSITION WITH STYRENE BUTADIENE LATEX ADDITIVE

CROSS-REFERENCE TO RELATED APPLICATION

The application on which this patent is based is a continuation-in-part of prior, commonly-assigned application Ser. No. 09/237,512, filed Jan. 26, 1999, now U.S. Pat. No. 6,184,287 B1, the disclosure of which is incorporated herein by reference.

BACKGROUND OF THE INVENTION

1. Field of Invention

The present invention relates to improved gypsum wallboard and to materials and processes for making such products.

2. Background

Gypsum wallboard is conventionally made by depositing an aqueous slurry of calcined gypsum ("gypsum slurry") between large sheets of paper or other material and allowing the slurry to dry. Calcined gypsum is composed of calcium sulfate hemihydrate ($CaSO_4 \cdot \frac{1}{2}H_2O$) which rehydrates to gypsum ($CaSO_4 \cdot 2H_2O$) during the drying process. See Kirk Othmer, *Encyclopedia of Chemical Technology*, Second edition, 1970, Vol. 21, Pages 621–624, the disclosure of which is also incorporated herein by reference.

In order to achieve sufficient strength, traditional, commercial wallboard has been made with a density of about 1700 pounds (~772 kg.) per thousand square feet of ½ inch thick board. Although it would be desirable to reduce this density and hence overall board weight, previous attempts have met with limited success, primarily due to loss of strength.

U.S. Pat. No. 5,879,825 to Burke et al., the disclosure of which is also incorporated herein by reference, describes an approach for reducing gypsum wallboard density without sacrificing strength by including in the gypsum core an acrylic latex having a particular combination of properties. Acrylic latexes are expensive, and therefore commercially unattractive. Therefore, it is desirable to develop an alternate and less expensive approach to accomplishing this objective.

SUMMARY OF THE INVENTION

In accordance with the present invention, it has been discovered that certain styrene butadiene latexes, modified to be substantially stable against divalent ions, can also reduce gypsum wallboard density without sacrificing strength. Because these latexes are generally less expensive to manufacture than acrylic latexes, it has also been found that commercial use of these latexes is feasible.

Accordingly, the present invention provides a new composition for making gypsum products comprising water, calcium sulfate hemihydrate and a styrene butadiene polymer latex substantially stable against divalent ions in which the styrene butadiene polymer includes at least 0.25 wt. % of an ionic monomer. In addition, the present invention also provides a new process for making gypsum wallboard from this composition as well as the wallboard so made. Preferably, the styrene butadiene polymer of the latex used in the present invention includes copolymerized sodium 2-acrylamido-2-methyl propanesulfonic acid salt, known industrially as "sodium AMPS."

DETAILED DESCRIPTION

In accordance with the present invention, gypsum wall board can be made lighter in weight without sacrificing strength by including in the gypsum slurry used to make the board a styrene butadiene polymer latex substantially stable against divalent ions in which the styrene butadiene polymer includes at least 0.25 wt. % of an ionic monomer.

The styrene butadiene latexes used in accordance with the present invention are substantially stable against divalent ions. By "substantially stable against divalent ions" is meant that a latex will exhibit no significant coagulation or flocculation when 10 ml (milliliters) of a 2 wt. % calcium chloride aqueous solution is slowly added to 50 ml of the latex. By slowly added is meant that the calcium chloride solution is added to 50 ml of the latex with stirring over a period of time between 5 and 30 seconds.

The amount of styrene and butadiene in the polymers of these latexes can vary widely.

For example, these polymers may contain 4 to 60 wt. % butadiene, more normally 7 to 40 wt. % butadiene and especially 10 to 30 wt. % butadiene. In addition, they may contain 20 to 95 wt. % styrene, more normally 45 to 90 wt. % styrene and especially 65 to 85 wt. % styrene. Moreover, in these polymers, the ratio of styrene to butadiene is typically in the range of 10/1 to 1/1, more usually 7/1 to 1.5/1, and even more typically 6/1 to 2/1.

In addition to styrene and butadiene, the styrene butadiene polymers of the present invention also include an ionic monomer. By "ionic monomer" is meant a monomer which addition polymerizes to form a homopolymer which is water soluble when having a molecular weight of 5000. In other words, if a 5000 molecular weight homopolymer formed by addition polymerizing a monomer is water soluble, that monomer is "ionic" in the context of this invention. Examples of suitable ionic monomers are 2-acrylamido-2-methyl propanesulfonic acid salt, styrene sulfate salt, styrene sulfonate salt, allyl sulfonate salt, 3-sulfopropyl acrylate salt, 3-sulfopropyl methacrylate salt, 2-sulfoethyl acrylate salt, 2-sulfoethyl methacrylate salt, maleic acid, itaconic acid and salts of maleic acid and itaconic acid. The cations of these salt are normally sodium, potassium or ammonium, more typically sodium or potassium. 2-acrylamido-2-methyl propanesulfonic acid salt is the preferred ionic monomer, with sodium 2-acrylamido-2-methyl propanesulfonic acid salt being especially preferred. 2-acrylamido-2-methyl propanesulfonic acid is known in industry as "AMPS," which is a trademark of The Lubrizol Company.

The amount of ionic monomer in the styrene butadiene polymers of the invention can vary widely. As little as about 0.25 wt. % to as much as about 20 wt. %, based on the weight of the polymer, are effective. Typically, the polymers will contain about 0.5 to 10, more often about 1 to 5 wt. %, ionic monomer based on the weight of the polymer.

In addition to styrene, butadiene and the ionic monomer, the polymers of the invention may also include 0.25 to 20 wt. % of hydroxyethyl acrylate, hydroxyethyl methacrylate, acrylonitrile, methacrylonitrile, acrylamide and/or methacrylamide. These "hydrophilic adjunct comonomers" have been found to enhance the effect of the ionic monomers in that the overall stability against divalent ions exhibited by a polymer including an ionic monomer as well as a hydrophilic adjunct comonomer is greater than would have been predicted by the rule of mixtures. A hydrophilic adjunct comonomer content of 0.5 to 10 wt. %, or even 1 to 4 wt. %, is more typical.

In addition to the foregoing monomers, the styrene butadiene polymers of the present invention may also include other addition monomers. Examples are isoprene, chloroprene, alpha-methylstyrene, 4-methylstyrene, 4-tertbutylstyrene, 4-ethylstyrene, divinylbenzene, vinylidene chloride, 2-vinylpyridene, 4-vinylpyridene and especially acrylic acid, methacrylic acid and their derivatives such as metal and ammonium salts, substituted and unsubstituted amides (other than acrylamide which is an hydrophilic adjunct comonomer), nitriles, and $C_1$ to $C_{12}$ esters. In such cases, the polymer should contain no more than about 30 wt. %, more typically no more than 15 wt. %, other addition monomer.

Styrene butadiene polymer latexes are typically made by aqueous emulsion polymerization. In carrying out such processes, the monomers forming the polymer are emulsified in water using suitable surfactants, usually anionic or non-ionic. Other ingredients such as free-radical initiators, chelating agents, chain transfer agents, biocides, defoamers and antioxidants can also be added. Once the free-radical initiator is activated, the monomers polymerize together producing the product polymer. As is well known, the arrangement of multiple monomers in a product polymer can be determined, at least to some degree, by controlling the manner which the monomers are added to the system. If all the monomers are added at the same time, the product polymer will have a more random distribution of monomers. If added in stages, the polymer will have a more ordered distribution of monomers.

A typical polymer latex produced by emulsion polymerization contains enough surfactants and other ingredients to prevent the product polymer from separating out from the water phase upon standing. However, these surfactants and other ingredients are usually insufficient to prevent coagulation or flocculation of the polymer if the latex is contaminated with significant amounts of divalent or trivalent ions. Therefore, such latexes can be expected to coagulate or flocculate prematurely if contacted with gypsum slurries used in the manufacture of gypsum wallboard, since such slurries contain significant concentrations of calcium ions, which are divalent.

In order to avoid this problem, additional surfactants can be incorporated into the latexes to keep them stable against calcium ions. However, gypsum slurries already contain significant concentrations of particular types of surfactants and other ingredients to enable the slurries to be frothed (foamed) during manufacture. Accordingly, it is desirable to avoid adding still additional surfactants to these systems, since different surfactant packages can interact with one another and thereby become ineffective.

In accordance with the present invention, therefore, the styrene butadiene latex includes a significant amount of a monomer, the ionic monomer, which imparts its own surface active properties to the polymer. As a result, additional surfactants for imparting calcium ion stability to a latex of the polymer can be reduced or even eliminated entirely. Therefore, when such latexes are added to gypsum slurries in the manufacture of gypsum wallboard, problems occurring from mixing incompatible surfactant packages can be avoided.

Styrene butadiene latexes which are especially useful in accordance with the present invention are described in commonly-assigned application Ser. No. 09/237,512, filed Jan. 26, 1999, now U.S. Pat. No. 6,184,287, the disclosure of which is incorporated herein by reference. In general, these latexes are formed by emulsion polymerization of styrene and butadiene in the presence of an in situ seed polymer composed of polymerized styrene and an AMPS salt, preferably Na-AMPS. Normally, the seed polymer is made by emulsion polymerization of styrene and Na-AMPS only, although butadiene may be included as an additional comonomer if desired. These latexes have been designed for mixing with cement used for cementing oil wells and are particularly stable against divalent ions. The conditions encountered in gypsum slurries are less severe than those in oil well cementing, and so less ionic monomer may be acceptable when these polymers are used in the present invention as compared to oil well cementing applications.

Styrene butadiene latexes of particular utility in accordance with the present invention are formed by emulsion polymerizing the monomers identified in the following Table 1 in accordance with the general procedure described in the above-noted U.S. Pat. No. 6,184,287 (application Ser. No. 09/237,512, filed Jan. 26, 1999,:

TABLE 1

Components of Styrene Butadiene Polymers, wt. %

| Example | NaAMPS | Styrene | Butadiene | HEA[1] | Acrylo[2] | Results |
|---------|--------|---------|-----------|--------|-----------|---------|
| 1 | 2.5 | 77.5 | 15 | 3 | | |
| 2 | 2.5 | 67.5 | 15 | 3 | 10 | |
| 3 | 5.5 | 67.2 | 26 | 1.3 | | |

[1]Hydroxyethyl acrylate
[2]Acrylonitrile

The amount of styrene butadiene latex that should be incorporated into a gypsum slurry in accordance with the present invention can vary widely, and essentially any amount can be used. From a practical standpoint, the amount of latex should be enough so that a noticeable decrease in density of product gypsum wallboard can be achieved without sacrificing strength but not so much that the product wallboard product becomes economically unattractive. In general, this means that the amount of latex added should be enough so that the styrene butadiene polymer is present in the product composition is about 0.1 to 10 wt. %, based on the weight of calcium sulfate hemihydrate in the composition. More typically, the amount of styrene butadiene polymer in the composition is 0.25 to 5 wt. %, and especially 0.5 to 1.5 wt. %, based on the weight of calcium sulfate hemihydrate in the composition.

Gypsum slurries for manufacture of wallboard typically contain various additional ingredients, as well known to those skilled in the art. Examples of such ingredients are accelerators, starch , retarders, paper pulp and so forth. See the above-noted Burke et al. patent, U.S. Pat. No. 5,879,825, especially Table I. Such components can also be included in the compositions produced in accordance with the present invention.

The gypsum-containing compositions of the present invention are used in the same way as conventional gypsum slurries to manufacture gypsum wallboard product. That is, they are deposited between large sheets of paper or other material and allowed the dry whereby the calcium sulfate hemihydrate in the system rehydrates into the dihydrate, i.e. gypsum, thereby forming the completed wallboard product. In commercial practice, the process is carried out in high volume using machines having traveling webs which rapidly move the incipiently-formed product through ovens under precisely controlled heating conditions for removing exactly the right amount of water. In this environment, it is desirable that the amount of water in the starting gypsum slurry be controlled so that the wallboard product is dried to the right amount when it leaves the oven.

To this end, conventional gypsum slurries for making wallboard typically contain about 40 to 60 wt. %, more typically about 48 to 55 wt. % calcium sulfate hemihydrate and less than 60 wt. %, more typically less than 50 wt. % water, based on the weight of the composition. See Table I of the above-noted Burke et. al. patent. The gypsum slurries of the present invention may also contain the same amounts of calcium sulfate hemihydrate and water, especially when intended for use in making gypsum wallboard in modern high speed equipment.

In this connection, it should be appreciated that the amount of water which a styrene butadiene styrene butadiene latex adds to a gypsum slurry in accordance with the present invention is essentially trivial when making wallboard product under normal practice. This is because the amount of latex added will typically be small, e.g. 5 wt. % or less, and the amount of water in this latex will usually be less than 50 wt. %. Also, less gypsum slurry is needed to make a wallboard product of a given dimension, since its density is less, and hence less water derived from the gypsum slurry is present in the inventive gypsum slurries in the first place. This means that the net effect of including a styrene butadiene latex in a gypsum slurry in accordance with the present invention may actually be to reduce the overall water content of the slurry by a slight amount for a wallboard product of a given dimension. In any event, those skilled in the art can readily determine by routine experimentation the precise amount of calcium sulfate hemihydrate and water to include in a particular embodiment of the inventive gypsum slurries in order that it can be used without problem in making gypsum wallboard in modern high speed equipment.

It should also be appreciated that the gypsum slurries of the present invention can be used in applications other than in making gypsum wallboard. For example, the inventive gypsum slurries can also be used in making molding plasters. In these applications, more or less water than indicated above can be included in the composition depending on the particular application desired. Indeed, the only real upper limit on the water content of the inventive gypsum slurry is that too much water may make its viscosity too low for practical application or may cause water to separate out. Similarly, the only real lower limit on the water content is stoichiometric—that is, enough water should be present to allow substantially complete hydration of the calcium sulfate hemihydrate to the dihydrate form. Within these broad limits, those skilled in the art can readily determine by routine experimentation the precise amount of water to use in a particular application.

Although only a few embodiments of the present invention have been described above, it should be appreciated that many modifications can be made without departing from the spirit and scope of the invention. All such modifications are intended to be included within the scope of the present invention, which is to be limited only by the following claims.

We claim:

1. A composition for making gypsum products comprising
    water,
    a foaming agent, paper pulp or both,
    calcium sulfate hemihydrate, and
    an aqueous styrene butadiene polymer latex substantially stable against divalent ions in which the styrene butadiene polymer includes at least 0.25 wt. % of 2-acrylamido-2-methyl propanesulfonic acid salt, said aqueous styrene butadiene polymer present in an amount of about 0.1 to 10 wt. % based on the weight of the calcium sulfate hemihydrate.

2. The composition of claim 1, wherein the polymer latex is prepared by aqueous emulsion polymerization of a monomeric mixture comprising styrene and butadiene in the presence of a seed polymer prepared by aqueous emulsion polymefization of styrene and a salt of 2-acrylamido-2-methyl propanesulfonic acid.

3. The composition of claim 1, wherein the styrene butadiene polymer contains a hydrophilic adjunct comonomer selected from the group consisting of hydroxyethyl acrylate, hydroxyethyl methacrylate, acrylonitrile, methacrylonitrile, acrylamide and methacrylamide.

4. The composition of claim 1, wherein the styrene butadiene polymer contains about 4 to 60 wt. % butadiene, 20 to 95 wt. % styrene, 1 to 20 wt. % ionic monomer and further wherein the styrene/butadiene weight ratio in the polymer is 10/1 to 1/1.

5. The composition of claim 4, wherein the styrene butadiene polymer contains about 7 to 40 wt. % butadiene, 45 to 90 wt. % styrene and 2 to 10 wt. % ionic monomer and further wherein the styrene/butadiene weight ratio in the polymer is 7/1 to 1.5/1.

6. The composition of claim 5, wherein the styrene butadiene polymer contains about 10 to 30 wt. % butadiene, 70 to 85 wt. % styrene and 3 to 7 wt. % ionic monomer and further wherein the styrene/butadiene weight ratio in the polymer is 6/1 to 2/1.

7. The composition of claim 1, wherein the amount of styrene butadiene polymer in the composition is 0.25 to 5 wt. %, based on the weight of calcium sulfate hemihydrate in the composition.

8. The composition of claim 7, wherein the amount of styrene butadiene polymer in the composition is 0.5 to 1.5 wt. %, based on the weight of calcium sulfate hemihydrate in the composition.

9. The composition of claim 1, wherein the composition contains at least about 50 wt. % calcium sulfate hemihydrate, based on the weight of the composition.

10. A composition comprising gypsum and an aqueous styrene butadiene polymer latex substantially stable against divalent ions, the latex being prepared by aqueous emulsion polymerization of a monomeric mixture comprising styrene and butadiene in the presence of a seed polymer prepared by aqueous emulsion polymerization of styrene and a salt of 2-acrylamido-2-methylpropanesulfonic acid in which least 0.25 wt. % of an ionic monomer.

11. The composition of claim 1, wherein the composition contains a foaming agent.

12. The composition of claim 1, wherein the composition contains paper pulp.

13. A composition for making gypsum wallboard comprising
    water,
    a foaming agent, paper pulp or both,
    about 40 to 60 wt. % of calcium sulfate hemihydrate, and
    an aqueous styrene butadiene polymer latex substantially stable against divalent ions in which the styrene butadiene polymer includes at least 0.25 wt. % of 2-acrylamido-2-methyl propanesulfonic acid salt, wherein the amount of styrene butadiene polymer in the composition is 0.1 to 10 wt. %, based on the weight of calcium sulfate hemihydrate in the composition.

14. The composition of claim 13, wherein the composition contains a foaming agent.

15. The composition of claim 13, wherein the amount of styrene butadiene polymer in the composition is 0.25 to 5 wt. %, based on the weight of calcium sulfate hemihydrate in the composition.

16. The composition of claim 15, wherein the amount of styrene butadiene polymer in the composition is 0.5 to 1.5 wt. %, based on the weight of calcium sulfate hemihydrate in the composition.

17. The composition of claim 15, wherein the styrene butadiene polymer contains about 4 to 60 wt. % butadiene, 20 to 95 wt. % styrene, 1 to 20 wt. % 2-acrylamido-2-methyl propanesulfonic acid salt, and further wherein the styrene/butadiene weight ratio in the polymer is 10/1 to 1/1.

18. The composition of claim 17, wherein the styrene butadiene polymer contains about 7 to 40 wt. % butadiene, 45 to 90 wt. % styrene and 2 to 10 wt. % 2-acrylamido-2-methyl propanesulfonic acid salt.

19. The composition of claim 18, wherein the styrene/butadiene polymer contains about 1 to 5 wt. % 2-acrylamido-2-methyl propanesulfonicacid salt.

20. A composition for making gypsum products comprising
water,
calcium sulfate hemihydrate, and
an aqueous styrene butadiene polymer latex substantially stable against divalent ions in which the styrene butadiene polymer includes about 0.25 to 20 wt. %, based on the weight of the polymer, of 2-acrylamido-2-methyl propanesulfonic acid salt.

21. The composition of claim 20, wherein the amount of styrene butadiene polymer in the composition is 0.5 to 1.5 wt. %, based on the weight of calcium sulfate hemihydrate in the composition.

22. The composition of claim 21, wherein the styrene butadiene polymer contains about 4 to 60 wt. % butadiene, 20 to 95 wt. % styrene, 1 to 20 wt. % 2-acrylamido-2-methyl propanesulfonic acid salt, and further wherein the styrene/butadiene weight ratio in the polymer is 10/1 to 1/1.

23. The composition of claim 22, wherein the styrene butadiene polymer contains about 7 to 40 wt. % butadiene, 45 to 90 wt. % styrene and 2 to 10 wt. % 2-acrylamido-2-methyl propanesulfonic acid salt.

24. The composition of claim 23, wherein the styrene/butadiene polymer contains about 1 to 5 wt. % 2-acrylamido-2-methyl propanesulfonic acid salt.

25. A composition for making gypsum products consisting essentially of water, calcium sulfate hemihydrate, and an aqueous styrene butadiene polymer latex substantially stable against divalent ions in which the styrene butadiene polymer consists of (a) styrene,
(b) butadiene,
(c) about 0.25 to 20 wt. %, based on the weight of the polymer, of 2-acrylamido-2-methyl propanesulfonic acid salt,
(d) an optional hydrophilic adjunct comonomer selected from the group consisting of hydroxyethyl methacryalte, acrylonitrile, methacrylonitrile, acrylamide and methacrylamide, and
(e) an optional additional monomer selected from the group consisting of isoprene, chloroprene, alpha-methylstyrene, 4-methylstyrene, 4-tert-butylstyrene, 4-ethylstyrene, divinylbenzene, vinylidene chloride, 2-vinylpyridine, 4-vinyl pyridine, metal and ammonium salts of acrylic acid and methacrylic acid, substituted and unsubstituted amides of acrylic acid and methacrylic acid other than acrylamide and methacrylamide, nitrites of acrylic and methacrylic acid other than acrylonitrile and methacrylonitrile, and $C_1$ to $C_{12}$ esters of acrylic acid and methacrylic acid.

26. The composition of claim 25, wherein the polymer contains hydroxyethyl acrylate.

27. The composition of claim 26, wherein the polymer contains acrylonitrile.

28. The composition of claim 25, wherein the amount of styrene butadiene polymer in the composition is 0.5 to 1.5 wt. %, based on the weight of calcium sulfate hemihydrate in the composition.

29. The composition of claim 25, wherein the styrene butadiene polymer contains about 4 to 60 wt. % butadiene, 20 to 95 wt. % styrene, 1 to 20 wt. % 2-acrylamido-2-methyl propanesulfonic acid salt, and further wherein the styrene/butadiene weight ratio in the polymer is 10/1 to 1/1.

30. The composition of claim 29, wherein the styrene butadiene polymer contains about 7 to 40 wt. % butadiene, 45 to 90 wt. % styrene and 2 to 10 wt. % 2-acrylamido-2-methyl propanesulfonic acid salt.

31. The composition of claim 30, wherein the styrene/butadiene polymer contains about 1 to 5 wt. % 2-acrylamido-2-methyl propanesulfonic acid salt.

* * * * *